(12) United States Patent
Shibao et al.

(10) Patent No.: US 10,744,960 B2
(45) Date of Patent: Aug. 18, 2020

(54) VEHICLE INTERIOR TRIM ASSEMBLY AND METHOD OF FORMING THE SAME

(71) Applicant: FORD GLOBAL TECHNOLOGIES, LLC, Dearborn, MI (US)

(72) Inventors: Fu Shibao, Nanjing (CN); Xue Zhi Jin, Nanjing (CN); Xu Wei, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 564 days.

(21) Appl. No.: 15/240,306

(22) Filed: Aug. 18, 2016

(65) Prior Publication Data
US 2017/0057427 A1    Mar. 2, 2017

(30) Foreign Application Priority Data
Aug. 28, 2015  (CN) .......................... 2015 1 0543988

(51) Int. Cl.
*B60R 13/02*  (2006.01)

(52) U.S. Cl.
CPC ................ *B60R 13/0212* (2013.01)

(58) Field of Classification Search
CPC .. B60R 13/02; B60R 13/0212; B60R 13/0275
USPC ........................................................ 296/214
See application file for complete search history.

(56) References Cited

U.S. PATENT DOCUMENTS

| 3,097,015 | A | * | 7/1963 | Nagel | B60R 13/0206 296/214 |
| 4,600,621 | A | * | 7/1986 | Maurer | B32B 5/24 428/121 |
| 4,718,714 | A | * | 1/1988 | Tanino | B60R 13/0231 296/214 |
| 4,923,245 | A | * | 5/1990 | Kuwabara | B60R 13/0206 24/295 |
| 4,978,407 | A | * | 12/1990 | Ardissone | B29C 51/087 156/216 |
| 5,007,815 | A | * | 4/1991 | Shoji | B29C 33/14 249/93 |
| 5,275,865 | A | * | 1/1994 | Nicolay | B32B 5/26 428/174 |
| 5,823,611 | A | * | 10/1998 | Daniel | B60R 13/0225 296/214 |
| 5,938,887 | A | * | 8/1999 | Reynolds | B29C 44/1257 156/475 |
| 5,941,590 | A | * | 8/1999 | Reynolds | B29C 45/14196 296/39.1 |
| 6,120,090 | A | * | 9/2000 | Van Ert | B29C 49/0047 280/751 |
| 7,607,684 | B2 | | 10/2009 | Downey et al. | |
| 7,699,343 | B2 | | 4/2010 | Kwak et al. | |
| 7,806,433 | B2 | | 10/2010 | Mitsuo et al. | |
| 7,992,892 | B2 | | 8/2011 | Jaramillo | |

(Continued)

*Primary Examiner* — Hilary L Gutman
(74) *Attorney, Agent, or Firm* — David Coppiellie; King & Schickli, PLLC

(57) ABSTRACT

An interior trim assembly of a vehicle extends along width and height directions. The interior trim assembly includes a headliner having a substrate and a cover together defining a folded portion. A first cross-section of the folded portion along the width direction includes first and second cover portions and a first substrate portion of the substrate positioned between the first and second cover portions.

10 Claims, 4 Drawing Sheets

(56) References Cited

U.S. PATENT DOCUMENTS

Figure 1:
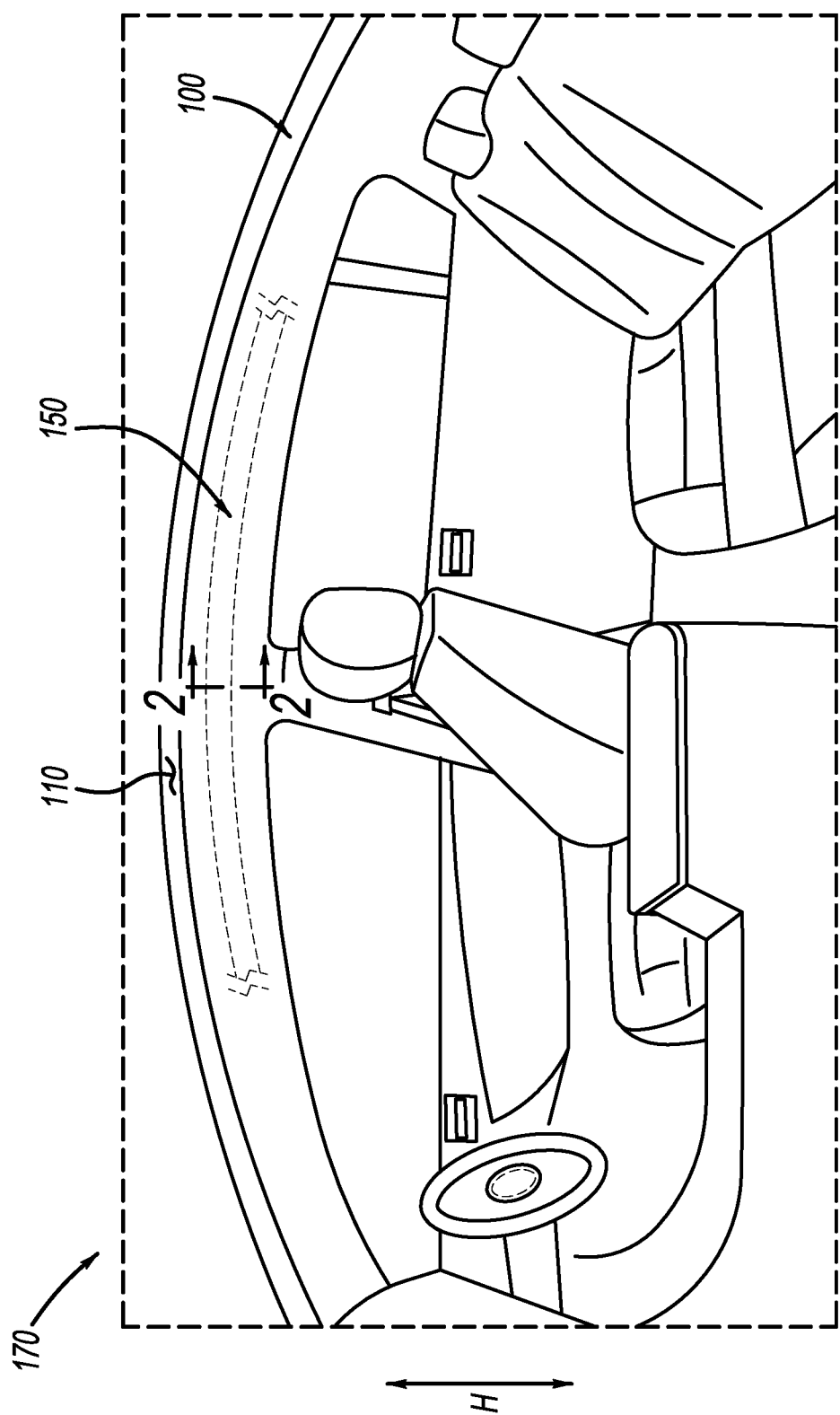

| | | | |
|---|---|---|---|
| 8,641,136 B2* | 2/2014 | Kring | B60R 13/0225 |
| | | | 296/214 |
| 8,967,661 B2 | 3/2015 | Mueller et al. | |
| 9,022,421 B2 | 5/2015 | Zucal | |
| 9,302,458 B2* | 4/2016 | Huelke | B32B 38/0012 |
| 9,586,554 B1* | 3/2017 | Baer | B60R 21/213 |
| 9,889,812 B1* | 2/2018 | Bauer | B60R 21/213 |
| 2005/0173907 A1 | 8/2005 | Welford | |
| 2015/0115575 A1 | 4/2015 | Jovicevic | |
| 2015/0360635 A1* | 12/2015 | Thomas | B60R 21/213 |
| | | | 280/730.2 |

* cited by examiner

VEHICLE INTERIOR TRIM ASSEMBLY AND METHOD OF FORMING THE SAME

TECHNICAL FIELD

The present invention relates to a vehicle interior trim assembly and a method of forming the same.

BACKGROUND

With the increasing development of safety regulations, more vehicles are equipped with side curtain airbags or window airbags to provide protection for a passenger during a side impact. The side curtain airbag is often located at an area near the roof rail, a pillar interior trim, and a headliner. The side curtain airbag, prior to its deployment, is concealed by the roof rail, the pillar interior trim and the headliner. When the airbag is deployed, the airbag is inflated and expanded, and a guide member is often used to guide the airbag to travel in a predetermined path.

U.S. Pat. No. 8,876,152 discloses an inflatable restraint assembly to guide the deployment of a side curtain airbag.

SUMMARY

In one or more embodiments, an interior trim assembly of a vehicle is provided. That interior trim assembly extends along width and height directions. The interior trim assembly includes a headliner including a substrate and a cover together defining a folded portion. A first cross-section of the folded portion along the width direction includes first and second cover portions. A first substrate portion of the substrate is positioned between the first and second cover portions.

In another or more embodiments, a method is provided of forming an interior trim assembly of a vehicle extending along vehicle width and height directions. The method includes forming a headliner. The headliner includes a substrate and a cover together defining a folded portion. A first cross-section of the folded portion along the vehicle width direction includes first and second cover portions of the cover and a first substrate portion of the substrate positioned between the first and second cover portions.

One or more advantageous features as described herein will be readily apparent from the following detailed description of one or more embodiments when taken in connection with the accompanying drawings.

BRIEF DESCRIPTION OF THE DRAWING FIGURES

Figure 2:
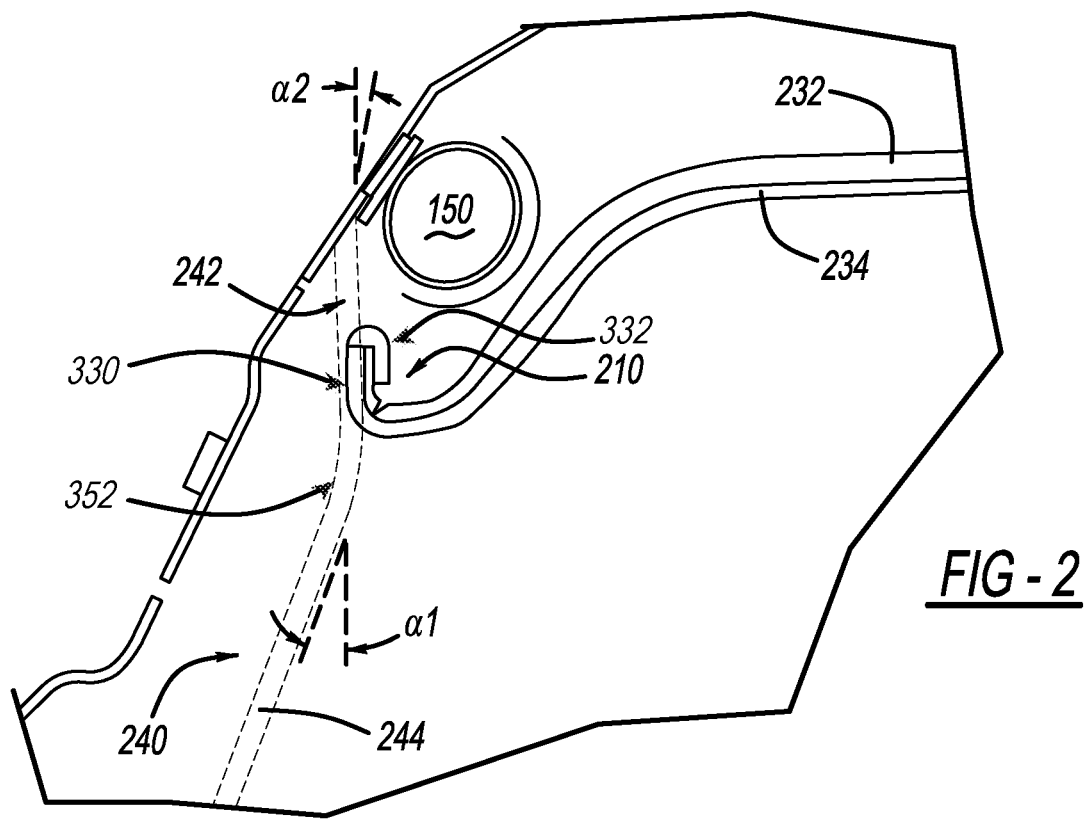
Figure 4:
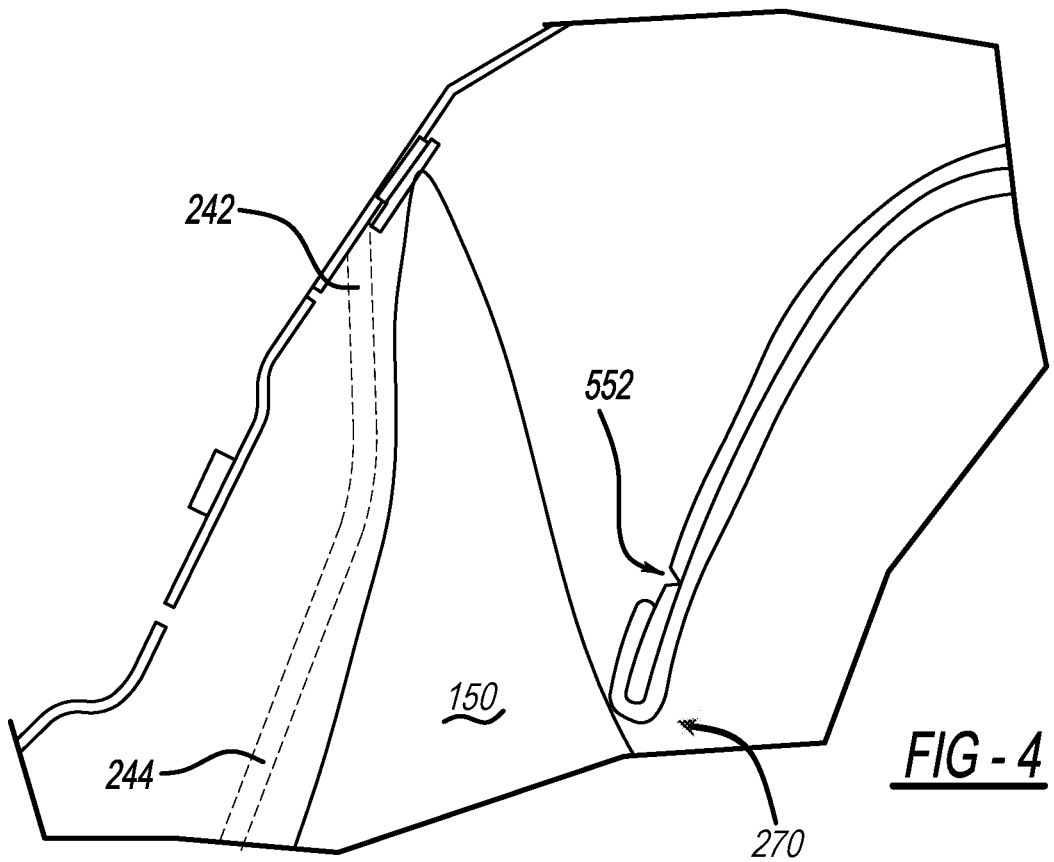
Figure 3:
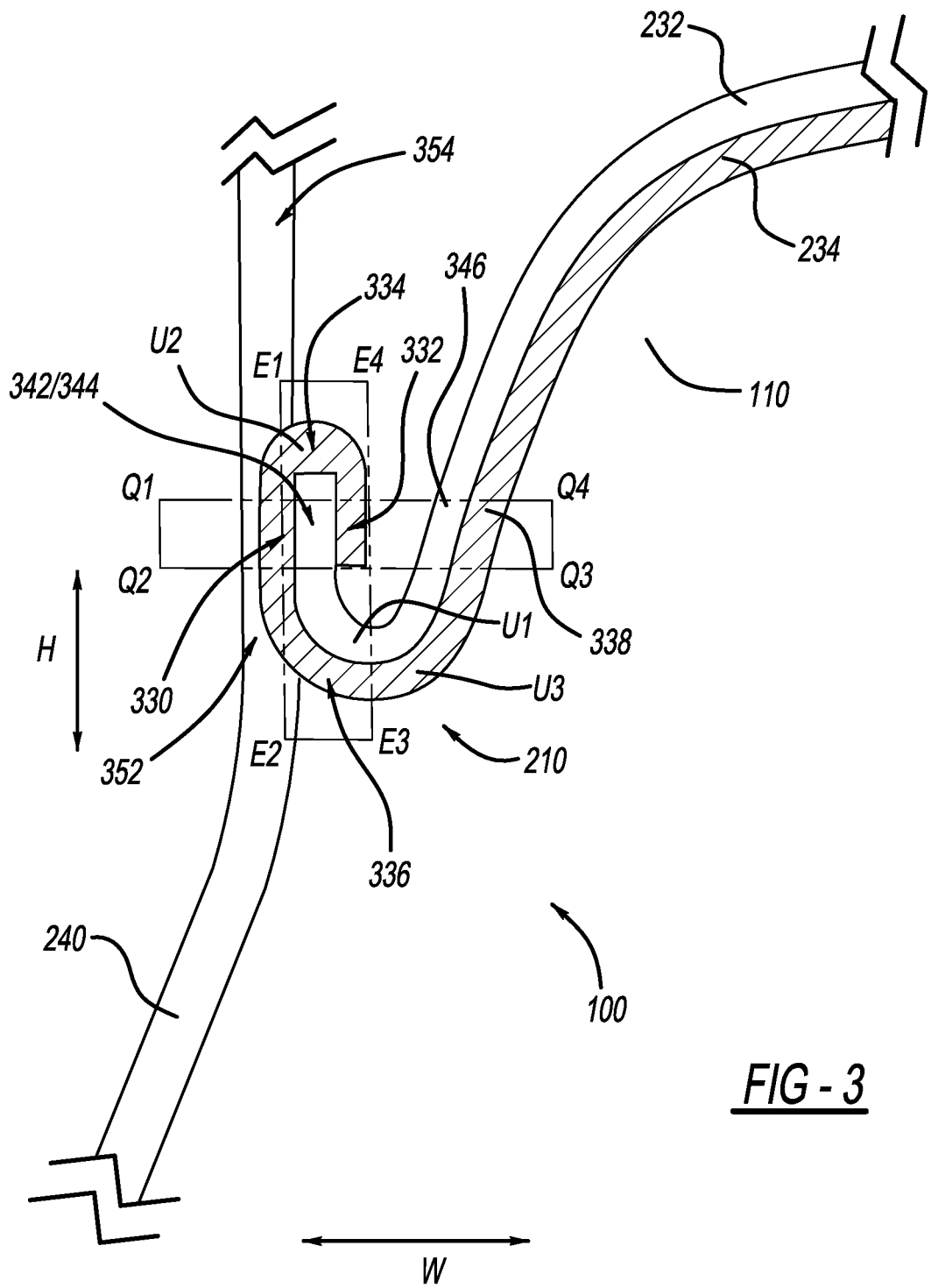
Figure 5:
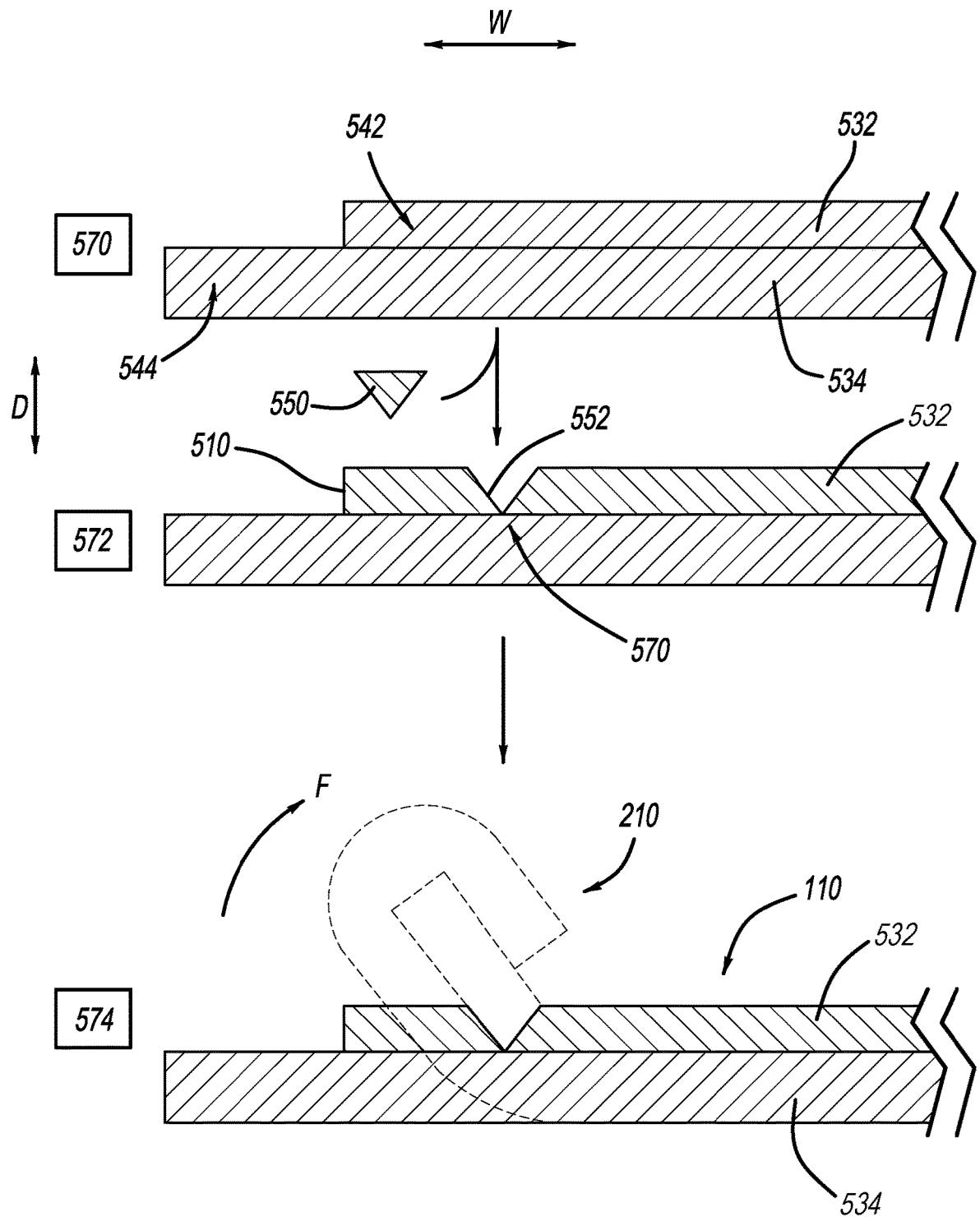

FIG. 1 illustratively depicts a partial interior view of a vehicle with an interior trim assembly according to one or more embodiments;

FIG. 2 illustratively depicts a cross-sectional view of the vehicle referenced in FIG. 1, taken along line 2-2, prior to the deployment of a side curtain airbag;

FIG. 3 illustratively depicts an enlarged partial view of a headliner and a side body trim of the vehicle referenced in FIG. 2;

FIG. 4 illustratively depicts a cross-sectional view of the vehicle referenced in FIG. 2 after the deployment of the side curtain airbag; and FIG. 5 illustratively depicts a flow chart of forming the headliner according to one or more embodiments.

DETAILED DESCRIPTION

As referenced in the FIG.s, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

In certain existed designs, a guide member may be needed to guide the travel of the side curtain airbag along a predetermined path. An interference engagement of an interior trim to a vehicle pillar is also desirable for aesthetic considerations. Power forces associated with a deployment of the side curtain airbag may tear off the headliner and the vehicle pillar, resulting in damage to the vehicle parts. Accordingly, and when the side curtain airbag deploys, costs in servicing the damaged parts continue to be high and timing and labor may also be at a loss.

As detailed herein elsewhere, a vehicle interior trim assembly and a method of forming the same are provided, to overcome at least in part the above-identified issues. Advantageously, the interior trim assembly of a vehicle has a simplified structure and mechanism with which damage to vehicle parts may be reduced during the deployment of the side curtain airbag.

With reference to FIGS. 1-3, which illustratively depict a vehicle 170 including an interior assembly 100 according to one or more embodiments. The interior assembly 100 extends along a vehicle height direction H and a vehicle width direction W, and includes a headliner 110 positioned on the vehicle roof. The interior assembly 100 may further include a side body trim 240 positioned on a side of the vehicle body to interface the headliner 110. The side body trim 240 may be connected to and cover the vehicle pillar, for instance, but not limited to, the vehicle B pillar.

FIG. 3 illustratively depicts an enlarged partial cross-sectional view of the headliner 110 and the side body trim 240. As illustrated in FIG. 3, the headliner 110 includes a substrate 232 and a cover 234 together defining a folded portion 210 to interface the side body trim 240, where a first cross-section $Q_1Q_2Q_3Q_4$ of the folded portion 210 along the width direction W includes first and second cover portions 330, 332 of the cover 234 and a first substrate portion 342 of the substrate 232 positioned between the first cover portion 330 and the second cover portion 332. A second cross-section $E_1E_2E_3E_4$ of the folded portion 210 along the height direction H includes third and fourth cover portions 334, 336 of the cover 234 and a second substrate portion 344 of the substrate 232 positioned between the third cover portion 334 and the fourth cover portion 336. Accordingly, the headliner 110 substantially includes a U-shaped structure U1 defined in the substrate 232 and a pair of opposing U-shaped structures U2 and U3 defined in the cover 234, where the U-shaped structure U1 is at least partially sandwiched between the pair of U-shaped structures U2 and U3.

In certain embodiments, and as illustratively depicted in FIG. 3, the first cross-section $Q_1Q_2Q_3Q_4$ of the folded portion may further include a fifth cover portion 338 of the cover 234 and a third substrate portion 346 of the substrate 232, where the third substrate portion 346 is positioned between the second cover portion 332 and the fifth cover portion 338 along the width direction W. The second cover portion 332 is spaced apart from the third substrate portion 346 along the width direction W. This configuration is believed to be particularly beneficial when the folded portion 210 sits relatively low along the height direction H and the remainder of the headliner 110 may need to turn sharply upward toward the roof of the vehicle 170.

Referring back to FIG. 2, the side body trim 240 may include a lower section 244 and an upper section 242 extending along the height direction H. The upper section 242 and the lower section 244 differ in angle to the height direction H. In one or more embodiments, the lower section 244 is of a lower angle α1 to the height direction H, the upper section 242 is of an upper angle α2 to the height direction H, and the upper angle α2 is smaller than the lower angle α1. The upper section 242 may be formed integral to the lower section 244, such that the upper section 242 of the side body trim 240 may effectively function as a guide member to lead a guiding path for the deployment of the side curtain airbag 150 so as to deliver additional benefits in reduced number of parts involved and hence reduced assembly time. The side curtain airbag 150 is connected to the vehicle body and may be at least partially concealed by the headliner 110 and the side body trim 240 prior to deployment.

The substrate 232 and the cover 234 may each be formed of different materials and independently include one or more sub layers. For instance, and in a non-limiting fashion, the substrate 232 may be formed of polyurethane foam (PU foam), and the cover 234 may be formed of nonwoven or knitted fabrics.

The side body trim 240 may differ in material from the folded portion 210, for instance, by including or being formed of polypropylene (PP). During assembly, the folded portion 210 of the headliner 110 is to interface the side body trim 240 and in particular a contacting portion 352 of the upper section 242 thereof. The thus formed sandwich structure of the folded portion 210 as configured on the headliner 110 imparts an enhanced elastic resistance to the folded portion, which in turn advantageously effectuates the formation of a lap joint via an interferential engagement between the folded portion 210 and the upper section 242.

In one or more embodiments, the side body trim 240 is greater than the folded portion 210 in material hardness such that the contacting portion 352 of the upper section 242 may protrude into the folded portion 210 with a certain distance to interface the folded portion 210 with an interference engagement. Accordingly, a reliable connection may be achieved between the folded portion 210 and the upper section 242 of the side body trim 240 without any additional fasteners. At an engagement position, such as the position illustratively depicted in FIG. 3, due to the elastic interface between the folded portion 210 and the contacting portion 352, a cross-sectional thickness of the first cover portion 330 is smaller than a cross-sectional thickness of the second cover portion 332.

Furthermore, the upper section and the lower section may differ in outer surface roughness. In particular, and in order to increase the friction resistance between the folded portion 210 and the upper section 242 of the side body trim 240, webs may be imparted onto the outer surface of the upper section, which may be integral to the upper section 242 or a rough sheet or pad adhered onto the upper section 242.

FIG. 5 illustratively depicts a flowchart of forming the headliner 110 according to one or more embodiments of the present invention. At step 570, an initial substrate 532 and an initial cover 534 with certain length and width are provided. The initial substrate 532 is placed alongside the initial cover 534, and the initial cover 534 is of a greater width than the initial substrate 532 along the width direction W. At this step, the initial cover 534 may not be connected, or may be connected, for instance, via adhesives, to the initial substrate 524.

In certain embodiments, and because of the material requirement of the headliner 110, the substrate 532 formed from the PU foam material is often relatively stiff, and thus it may be difficult to form the folded portion 210 by a conventional method. Accordingly and at step 572, a portion 550 in a certain volume is removed at a removal site 570 on the initial substrate 532 to define at least a notch 552 so as to facilitate folding of the substrate 532 at the notch 552. In one or more embodiments, a number of notches 552 are defined on the substrate 532 along the length direction L of the vehicle. The notch 552 may in particular be V-shaped; however in other embodiments, the notch 552 may be of any suitable shapes, for instance a rectangular notch. The notch 552 may be of any suitable depth along the depth direction D. When the notch 552 is a through-cut along the depth direction D, the initial substrate 552 may be pre-adhered onto the initial cover 534 via any suitable methods such as adhesives so as to avoid unwanted separation of the reminder portions of the initial substrate 552 after the removal of the portion 550.

The location of the removal site 570 may be strategically chosen to facilitate the formation and/or to obtain a particular size of the folded portion 210. For instance, and as illustratively depicted in FIG. 2, FIG. 4 and FIG. 5, the removal site 570 may be spaced apart from the first cover portion 330 and the second cover portion 332. Accordingly, the farther away of the removal site 570 is from an end 510 of the initial substrate 532, the more extended the folded portion 210 becomes in its dimension along the height direction H at the engagement position.

At step 574, the initial substrate 532 and the initial cover 534 are folded at the notch 552 along a direction F to form the folded portion 210. Adhesion tools such as adhesives may be employed to impart enhanced structural integrity to the folded portion 210.

With continuing reference to FIG. 2 and further in view of FIG. 4, which respectively depict views of the side curtain airbag 150 before and after its deployment. The side curtain airbag 150 is inflated and expands quickly during the deployment, and its downward travel is guided via the upper section 242 of the side body trim 240 such that the folded portion 210 moves or translates along the contacting portion 352 of the upper section 242. The upper section 242 is advantageously integral to the lower section 244, and defines thereupon a substantially smooth contacting portion. However in certain embodiments where it is desirable such as to maintain a relatively sturdier interface between the side body trim 240 and the folded portion 210 of the headliner prior to the deployment of the side curtain airbag, texture may be defined on the contacting portion to increase friction coefficient.

As detailed herein elsewhere, the upper angle α2 defined by the upper section 242 relative to the height direction H is smaller than the lower angle α1 defined by the lower section 244 relative to the height direction H, or in other words the upper section 242 is more parallel to the height direction H than the lower section 244. As the folded portion 210 continues to move downward along the vehicle height direction H to disengage the contacting portion 352 of the upper section 242, the folded portion 210 deploys by rotating about the notch 552 and proceeding to the final deployment position, such as the location 270 referenced in FIG. 4, without having to contact the lower section 244 of the side body trim 240.

That is to say, the opening angle and/or dimension of the notch 552 differ between when the side curtain airbag 150 is at a stowed position and at a deployed position; and the opening angle and/or dimension of the notch 552 increase during the deployment of the side curtain airbag 150. Accordingly, vehicle interior part assembly 100 including the headliner 110 and the side body trim 240 may very well be protected from damages due to the deployment of the side curtain airbag 150, and thus service costs may be reduced and enhanced safety may be realized with the reduced occurrence of flyaway of parts damaged.

Furthermore, the vehicle trim part assembly 100 is advantageous in structuring an elastic lap joint between the folded portion 210 of the headliner 110 and the upper section 242 of the side body trim 240, and thus avoiding unnecessary use of any additional fasteners or their associated receiving holes or retaining holes on the upper section 242. Moreover, the U-shaped structure U2 defines a smooth end so as to avoid unwanted scratches of the surface of the side body trim 240 and the side curtain airbag 150.

Embodiments described herein are exemplary and not meant to be limiting. One skilled in the art will readily recognize from such discussion, and from the accompanying drawings and claims that various changes, modifications and variations can be made therein without departing from the true spirit and fair scope of the motor vehicle interior trim assembly 100 as defined by the following claims.

What is claimed:

1. An interior trim assembly of a vehicle extending along a width direction and a height direction, comprising:
    a headliner including a substrate and a cover together defining a folded portion, wherein a first cross-section of the folded portion along the width direction includes a first cover portion and a second cover portion and a first substrate portion of the substrate positioned between the first cover portion and the second cover portion.

2. The interior trim assembly of claim 1, wherein a second cross-section of the folded portion along the height direction includes a third cover portion and a fourth cover portion and a second substrate portion of the substrate positioned between the third cover portion and the fourth cover portion.

3. The interior trim assembly of claim 1, wherein the first cross-section of the folded portion further includes a fifth cover portion and a third substrate portion of the substrate, the third substrate portion being positioned between the second cover portion and the fifth cover portion along the width direction.

4. The interior trim assembly of claim 3, wherein the second cover portion is spaced apart from the third substrate portion along the width direction.

5. The interior trim assembly of claim 1, further comprising a side body trim to interface the folded portion, wherein the side body trim includes a lower section and an upper section extending from the lower section along the height direction, the upper section differing from the lower section in angle to the height direction.

6. The interior trim assembly of claim 5, wherein the lower section is of a lower angle to the height direction, the upper section is of an upper angle to the height direction, and the upper angle is smaller than the lower angle in value.

7. The interior trim assembly of claim 5, wherein the folded portion of the headliner contacts a contacting portion of the upper section.

8. The interior trim assembly of claim 7, wherein the contacting portion is smaller in cross-sectional thickness than another portion of the upper section spaced apart from the contacting portion along the height direction.

9. The interior trim assembly of claim 5, wherein the upper section differs in outer surface roughness from the lower section.

10. The interior trim assembly of claim 5, wherein the side body trim differs in material from the folded portion.

* * * * *